(12) United States Patent
Dave et al.

(10) Patent No.: US 10,936,240 B2
(45) Date of Patent: Mar. 2, 2021

(54) USING MERGED SNAPSHOTS TO INCREASE OPERATIONAL EFFICIENCY FOR NETWORK CACHING BASED DISASTER RECOVERY

(71) Applicant: International Business Machines Corporation, Armonk, NY (US)

(72) Inventors: Abhishek S. Dave, Pune (IN); Shailesh S. Jeurkar, Pune (IN); Sandeep R. Patil, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/209,804

(22) Filed: Dec. 4, 2018

(65) Prior Publication Data
US 2020/0174692 A1    Jun. 4, 2020

(51) Int. Cl.
*G06F 3/06* (2006.01)
*G06F 16/11* (2019.01)
*G06F 11/14* (2006.01)

(52) U.S. Cl.
CPC .......... *G06F 3/0652* (2013.01); *G06F 3/0619* (2013.01); *G06F 3/0683* (2013.01); *G06F 11/1451* (2013.01); *G06F 16/128* (2019.01); *G06F 2201/84* (2013.01)

(58) Field of Classification Search
CPC .. G06F 3/0652; G06F 3/0619; G06F 11/1451; G06F 16/128; G06F 3/0683; G06F 2201/84
See application file for complete search history.

(56) References Cited

U.S. PATENT DOCUMENTS

2012/0303912 A1* 11/2012 Calder ............... G06F 3/0623
                                                                    711/162
2012/0310889 A1* 12/2012 McNeil ............. H04L 67/2857
                                                                    707/639

(Continued)

OTHER PUBLICATIONS

IBM, "Introduction to Active File Management (AFM)," IBM Knowledge Center, 2018, 4 pages, retrieved from https://www.ibm.com/support/knowledgecenter/STXKQY_5.0.0/com.ibm.spectrum.scale.v5r00.doc/bl1ins_introafm.htm.

(Continued)

*Primary Examiner* — Tasnima Matin
(74) *Attorney, Agent, or Firm* — Zilka-Kotab, P.C.

(57) ABSTRACT

A computer-implemented method, according to one embodiment, includes: selecting two previously captured snapshots and calculating a checksum for each file in each of the two snapshots. The checksums are used to determine whether the two snapshots are sufficiently similar to each other. In response to determining that the two snapshots are sufficiently similar to each other, important ones of the files in each of the two snapshots are identified. The identified important files which are located in a lower performance tier of a multi-tier data storage system are transitioned to a higher performance tier of the multi-tier data storage system. Moreover, a merged snapshot is created by merging the two snapshots, and the merged snapshot is provided for additional operations. Other systems, methods, and computer program products are described in additional embodiments.

20 Claims, 9 Drawing Sheets

(56) References Cited

U.S. PATENT DOCUMENTS

| | | | |
|---|---|---|---|
| 2013/0159359 A1* | 6/2013 | Kumar | G06F 16/185 707/822 |
| 2015/0081636 A1* | 3/2015 | Schindler | G06F 11/1482 707/639 |
| 2016/0110259 A1 | 4/2016 | Fang et al. | |
| 2016/0150012 A1* | 5/2016 | Barszczak | G06F 3/0607 709/219 |
| 2017/0147444 A1 | 5/2017 | Aronovich | |

OTHER PUBLICATIONS

IBM, "Cache and Home," IBM Knowledge Center, 2018, 3 pages, retrieved from https://www.ibm.com/support/knowledgecenter/STXKQY_5.0.0/com.ibm.spectrum.scale.v5r00.doc/bl1ins_cacheandhomeAFM.htm.

IBM, "AFM-based Asynchronous Disaster Recovery (AFM DR)," IBM Knowledge Center, 2018, 4 pages, retrieved from https://www.ibm.com/support/knowledgecenter/en/STXKQY_5.0.0/com.ibm.spectrum.scale.v5r00.doc/bl1ins_introductionafmdr.htm.

* cited by examiner

US 10,936,240 B2

USING MERGED SNAPSHOTS TO INCREASE OPERATIONAL EFFICIENCY FOR NETWORK CACHING BASED DISASTER RECOVERY

BACKGROUND

The present invention relates to data storage systems, and more specifically, this invention relates to the management and transfer of data between storage locations in a data storage system.

A clustered filesystem is a filesystem which is shared by being simultaneously mounted on multiple servers. Moreover, active file management (AFM) is a scalable, file system caching layer which is implemented in some clustered file systems. AFM allows users to create associations between a local cluster and a remote cluster, as well as define the location and flow of file data therebetween to automate the management of the data. It follows that clustered filesystems are somewhat insulated from experiencing data loss following disaster situations in which one of the multiple servers fail, and are therefore often utilized for data retention purposes.

For example, snapshot-based asynchronous disaster recovery architectures include a primary site and a secondary site. An initial snapshot taken at the primary site is passed to the secondary site, after which incremental snapshots of the primary site are transferred to the secondary site. The primary site often functions as a read-writeable fileset which is able to host applications that are given read/write access to the data stored therein. It follows that the data stored in the primary site is asynchronously replicated to the secondary site. Moreover, a recovery point objective (RPO) setting allows for the frequency at which the incremental snapshots are taken to be specified.

SUMMARY

A computer-implemented method, according to one embodiment, includes: selecting two previously captured snapshots and calculating a checksum for each file in each of the two snapshots. The checksums are used to determine whether the two snapshots are sufficiently similar to each other. In response to determining that the two snapshots are sufficiently similar to each other, important ones of the files in each of the two snapshots are identified. The identified important files which are located in a lower performance tier of a multi-tier data storage system are transitioned to a higher performance tier of the multi-tier data storage system. Moreover, a merged snapshot is created by merging the two snapshots, and the merged snapshot is provided for additional operations.

A computer program product, according to one embodiment, includes a computer readable storage medium having program instructions embodied therewith. The program instructions are readable and/or executable by a processor to cause the processor to: perform the foregoing method.

A system, according to yet another embodiment, includes: a processor; and logic integrated with the processor, executable by the processor, or integrated with and executable by the processor, the logic being configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
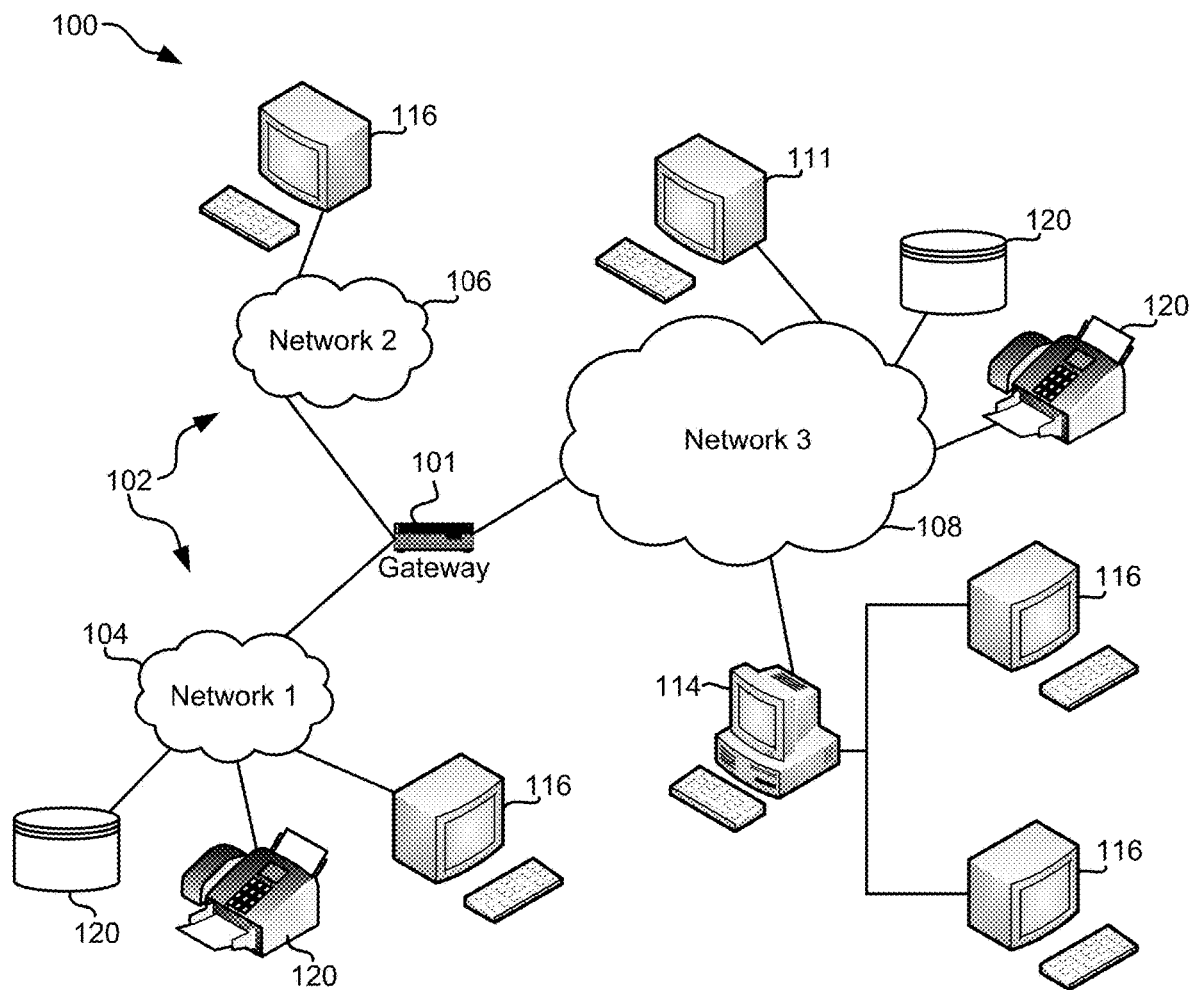
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to significantly improve the efficiency and consistency at which storage environments implementing WAN caching disaster recovery are able to operate. Some of the embodiments included herein are able to achieve this improved performance by accurately identifying data duplicity between caching snapshots and using this identified duplicity to merge snapshots. Moreover, "important" versions of files are identified (e.g., based on replication completion, a number of differences compared with previous versions, etc.) and transitioned to the appropriate performance storage tier while unimportant version of files are also transitioned to an appropriate performance storage tier if not already located therein, e.g., as will be described in further detail below.

In one general embodiment, a computer-implemented method includes: selecting two previously captured snapshots and calculating a checksum for each file in each of the two snapshots. The checksums are used to determine whether the two snapshots are sufficiently similar to each other. In response to determining that the two snapshots are sufficiently similar to each other, important ones of the files in each of the two snapshots are identified. The identified important files which are located in a lower performance tier of a multi-tier data storage system are transitioned to a higher performance tier of the multi-tier data storage system. Moreover, a merged snapshot is created by merging the two snapshots, and the merged snapshot is provided for additional operations.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor; and logic integrated with the processor, executable by the processor, or integrated with and executable by the processor, the logic being configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
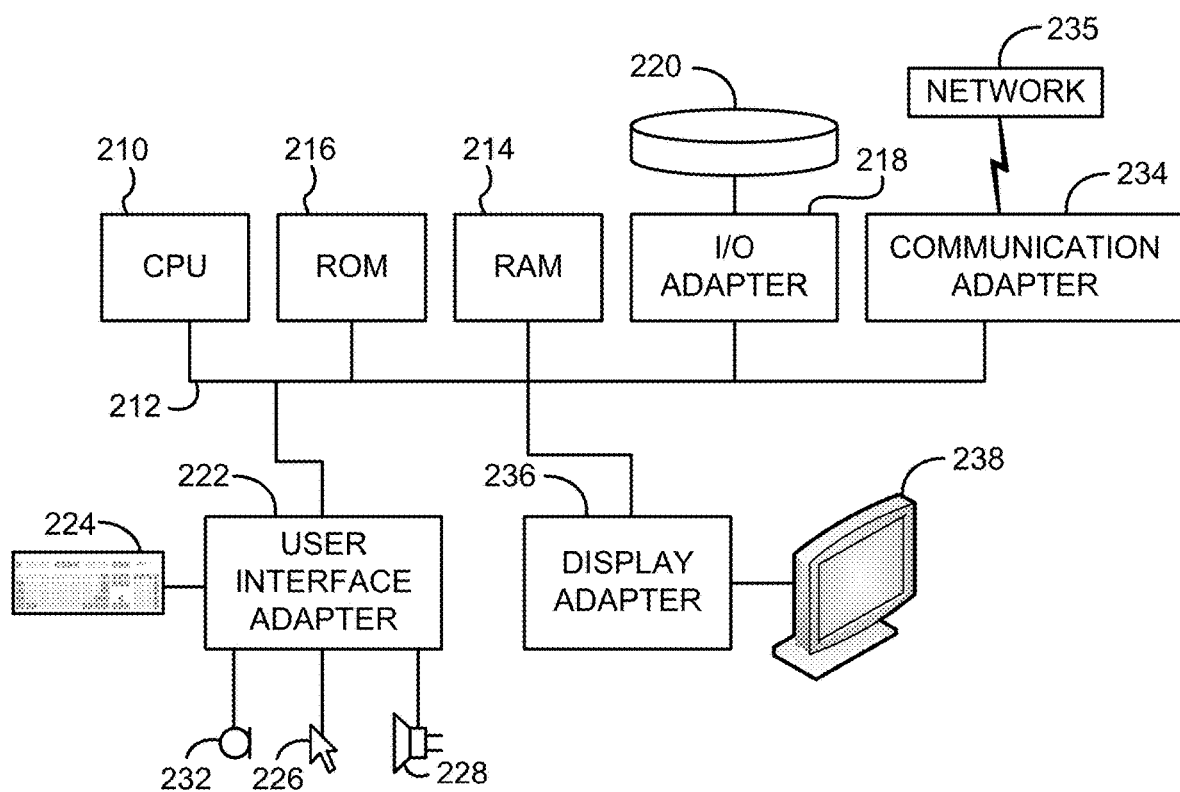
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
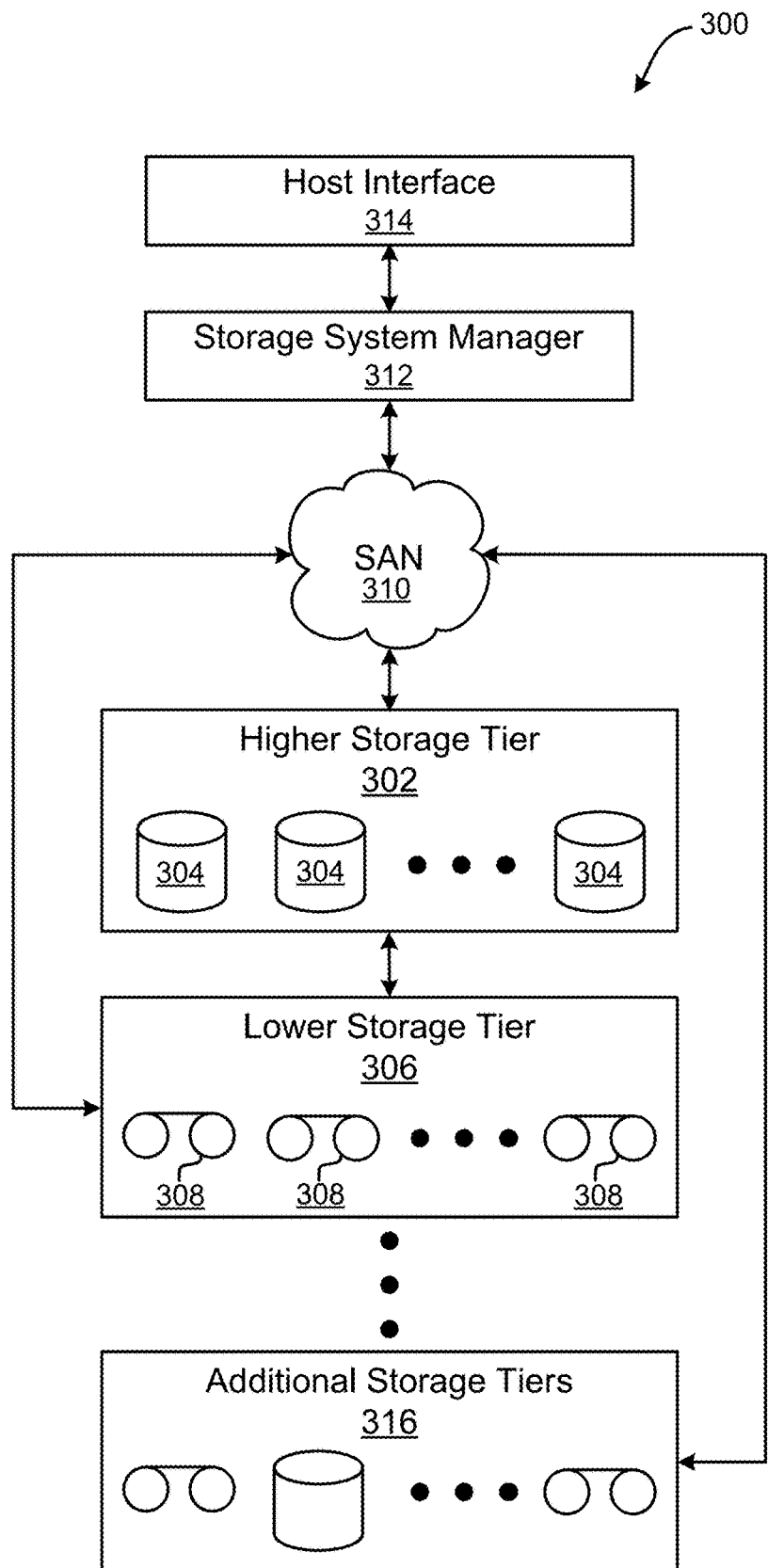
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, snapshot-based asynchronous disaster recovery architectures are utilized in order to avoid data loss in disaster situations. This has been implemented by taking an initial snapshot at a primary site, which is then passed to a removed secondary site. After the initial snapshot, incremental snapshots of the primary site are transferred to the secondary site. The primary site often functions as a read-writeable fileset which is able to host applications that are given read/write access to the data stored therein. It follows that the data stored at the primary site is asynchronously replicated to the secondary site. For instance, file user data, metadata, hard links, renames, clones, etc. at the primary site are replicated to the secondary site. However, file system and fileset related attributes, e.g., such as user, group and/or fileset quotas, replication factors, dependent filesets, etc., from the primary site are often not replicated to the secondary site.

Again, a consistent point-in-time view of the data at the primary site can be propagated in-line to the secondary site with the use of fileset based snapshots (e.g., "psnaps"). Moreover, an RPO setting allows for the frequency at which the incremental snapshots are taken to be specified. Increasing the RPO frequency is typically preferred, because although a network which connects the primary and secondary sites may be relatively slow, a snapshot is created for each interval at the RPO frequency. Thus, by increasing the RPO frequency (or equivalently decreasing the period between snapshots), the increased snapshot rate assists in protecting data at the primary site from intermediate corruption irrespective of network speeds. The number of snapshots which are retained at a given point in time have also been increased in an effort to improve data retention. For example, typically in a WAN caching environment, a default snapshot retention policy specifies that at least two snapshots are stored at any given time.

However, these efforts to increase the number of snapshots retained and/or increase the frequency at which snapshots are taken cause global snapshot limits to be reached rapidly. Once a global snapshot limit has been reached, the system is prevented from being able to create any additional snapshots thereby jeopardizing data retention. Snapshot limits have been increased in an effort to avoid this issue, but any increases to these snapshot limits cause significant performance problems due to the number of times quiesce operations are consequently performed on the filesystem.

In sharp contrast to the foregoing shortcomings experienced by conventional implementations, various ones of the embodiments included herein are able to merge snapshots based on the different versions of the same files included therein. Additionally, some of the embodiments are able to store different versions of the same file in a merged snapshot in each of their appropriate storage tiers. For example, those versions of a given file identified as being "important" are stored in higher performance storage tiers, while versions of the given file identified as not being "important" are stored in lower performance storage tiers, e.g., as will be described in further detail below.

Figure 4:
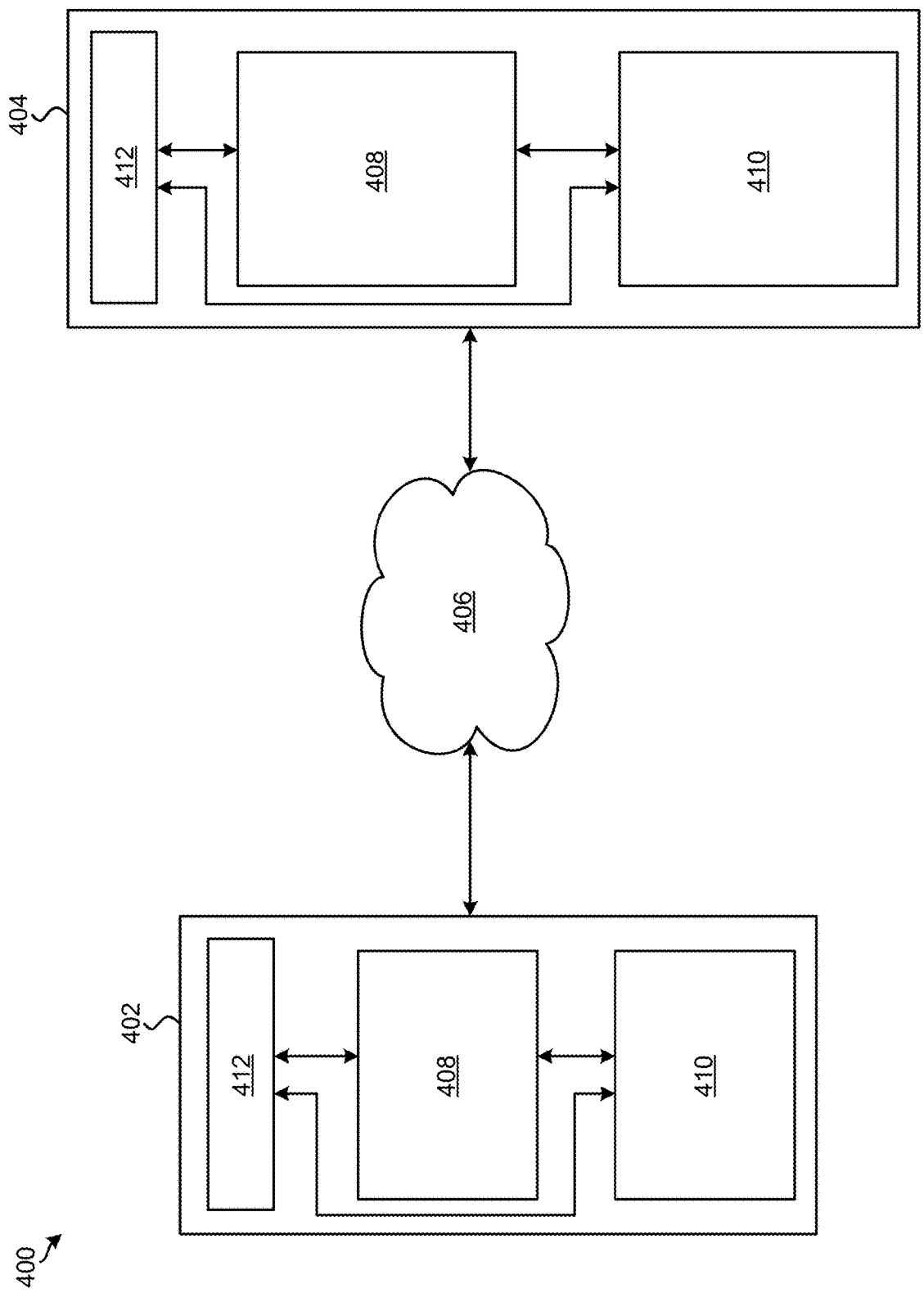
FIG. 4 is a partial representative view of a distributed data storage system in accordance with one embodiment.

Looking now to FIG. 4, a distributed data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a first storage location 402 and a second storage location 404 which are connected by a network 406. According to preferred approaches, the first storage location 402 and the second storage location 404 each include data storage components (e.g., types of memory) which are capable of achieving different data performance levels. In other words, the first and second storage locations 402, 404 each include a multi-tier data storage system which includes a lower performance storage tier 410 and a higher performance storage tier 408. With respect to the present description, the lower performance storage tier 410 has a lower level of performance (e.g., a lower achievable throughput, slower data access rates, higher write delays, etc.) at least with respect to that of the higher performance storage tier 408. According to an example, which is in no way intended to limit the invention, the higher performance storage tier 408 includes SSDs while the lower performance storage tier 410 includes HDDs.

Moreover, a controller (e.g., processor) 412 is included in each of the first and second storage locations 402, 404, each of the controllers 412 being electrically coupled to the respective higher and lower performance storage tiers 408, 410. The controllers 412 at the first and second storage locations 402, 404 may also be able to communicate with each other (e.g., send data, commands, requests, etc. to each other) using a connection to network 406.

The network 406 connecting the first and second storage locations 402, 404 may be a WAN according to some approaches. However, the network 406 may include any desired type of network, e.g., such as a LAN, a SAN, a personal area network (PAN), etc., e.g., depending on the approach. For instance, the type of network 406 used to connect the first and second storage locations 402, 404 may depend on the distance separating the storage locations. According to some approaches, the first and second storage locations 402, 404 may be geographically separated by any amount of physical distance.

As described above, snapshot-based asynchronous disaster recovery architectures implement a primary site (also referred to herein as a "primary storage location" or a "primary storage cluster") and a secondary site (also referred to herein as a "secondary storage location" or "secondary storage cluster"), the two sites being able to transfer data therebetween. For instance, snapshots are incrementally taken at the primary storage location and then passed (e.g., asynchronously replicated) to the removed secondary site for redundant storage. A storage snapshot is a set of reference markers for data at a particular point in time in some approaches. In other words, a snapshot serves as a detailed table of contents, providing accessible copies of data which may be accessed as desired.

Accordingly, the first storage location 402 functions as a "primary storage location", while the second storage location 404 serves as a "secondary storage location" in preferred approaches. However, this is in no way intended to be limiting. For example, in other approaches the first storage location 402 may function as the "secondary storage location", while the second storage location 404 serves as the "primary storage location" under normal operation and/or following a disaster recovery situation.

Furthermore, although FIG. 4 only depicts a single primary storage location connected to a single secondary site, the distributed data storage system 400 may include additional storage locations coupled to the locations depicted in the present embodiment. Thus, the second storage location 404 includes storage tiers 408, 410 (e.g., memory) having a larger combined storage capacity than that of the storage tiers 408, 410 included in the first storage location 402. As operations are performed at the first storage location 402, they are incrementally re-performed at the second storage location 404 over time using network 406 and various ones of the processes included herein. Accordingly, the controllers 412 may implement various processes of snapshot-based data retention procedures, e.g., as described below with respect to method 500.

Figure 5A:
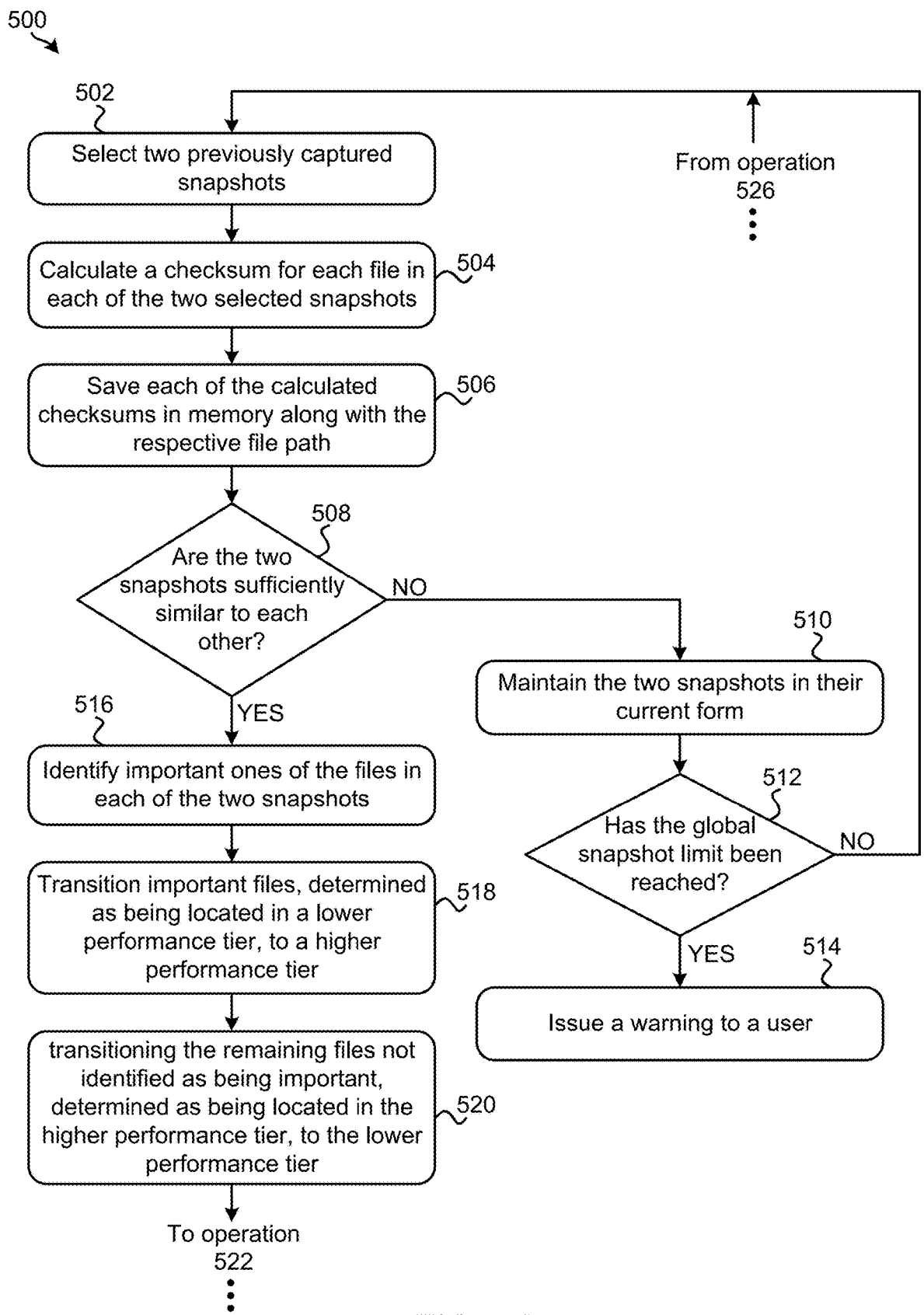
FIG. 5A is a flowchart of a method in accordance with one embodiment.
Figure 5A:
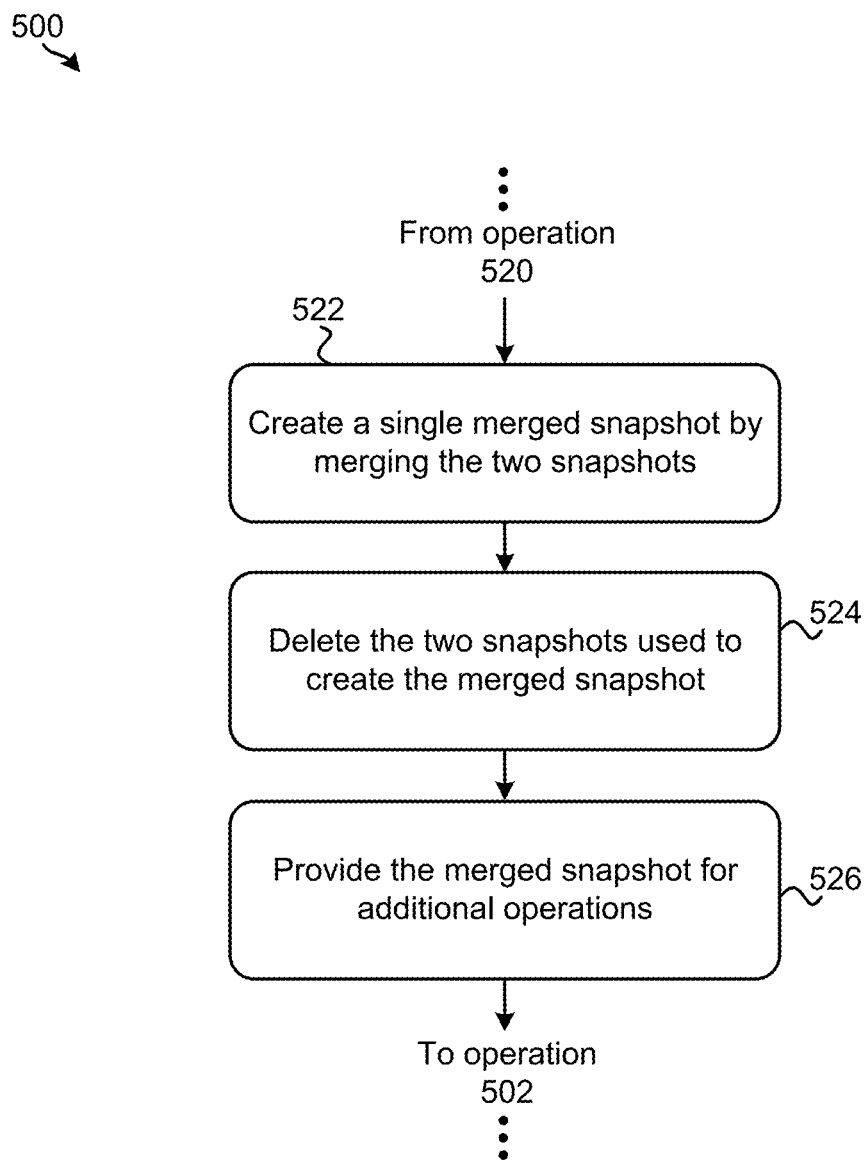

Referring now to FIG. 5A, a flowchart of a method 500 for merging snapshots is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller (e.g., see 410 in FIG. 4), a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes selecting two previously captured snapshots. Snapshots are typically captured at a source location and used to manage or update data stored at a backup location. The frequency, number, etc. of snapshots which are taken of a primary storage location varies depending on the approach. For instance, RPO and/or recovery target objective (RTO) settings may specify the frequency at which incremental snapshots of the primary storage location are taken. Moreover, RPO and/or RTO information may be derived from user configuration data, e.g., as would be appreciated by one skilled in the art after reading the present description.

Accordingly, the two snapshots selected in operation 502 were previously captured (e.g., "created") at a primary storage cluster. In some approaches the two snapshots are selected from a pool (e.g., queue) of snapshots that are at least temporarily stored at the primary storage cluster and which have not yet been synched to a secondary storage cluster. It should also be noted that although the various processes included in method 500 have been described with respect to merging two snapshots, more than two snapshots may be merged using the same or similar processes, e.g., as would be appreciated by one skilled in the art after reading the present description.

Although each of the snapshots are taken at a different point in time, copies of the same file often appear in multiple ones of the snapshots. Moreover, certain ones of these copies of the same file may be the same, similar or different depending on whether the file which they correspond to has been appended to, amended, truncated, deleted, etc. Accordingly, operation 504 includes calculating a checksum for each file in each of the two selected snapshots. In other words, operation 504 includes comparing copies of the same file to determine any differences therebetween. In some approaches a checksum for a given file is calculated by comparing each bit of the different copies of the given file. In other approaches, a filesystem retains the precise times at which each of the files included therein are modified. These modification times can thereby be used to determine whether a given file was modified at any point between the times at which two snapshots were captured. Further examination of the copies of a given file may be conducted in response to determining that the given file has been modified at a point between the times at which two snapshots were captured. In still other approaches, checksums can be calculated for the copies of each file in different snapshots using any processes which would be apparent to one skilled in the art after reading the present description.

Each of the calculated checksums are saved in memory along with the respective file path. See operation 506. In some approaches, each of the checksums are even stored in separate logical and/or physical locations. The checksums are further used to ascertain whether the two snapshots are sufficiently similar to each other. Accordingly, decision 508 includes determining whether the two selected snapshots are sufficiently similar to each other. With respect to the present description, two snapshots which are "sufficiently similar" to each other include at least a threshold amount of the same data. In other words, two snapshots are considered as being substantially similar in response to determining that at least a threshold amount of the data included in a first of the snapshots is the same as data included in a second of the snapshots. Depending on the approach, this threshold amount of matching data may be represented as a percentage of the overall amount of data included in the snapshots, an actual amount of data (e.g., 5 MB), a ratio, etc. According to an example, which is in no way intended to limit the invention, if 60% or more of the data included in two snapshots is determined as being the same, the two snapshots are considered as being substantially similar. However, it should be noted that "at least a threshold amount" is in no way intended to limit the invention. Rather than determining whether a value is above a threshold, equivalent determinations may be made, e.g., as to whether a value is within a predetermined range, whether a value is outside a predetermined range, whether an absolute value is above a threshold, whether a value is below a threshold, etc., depending on the desired approach.

Figure 5B:
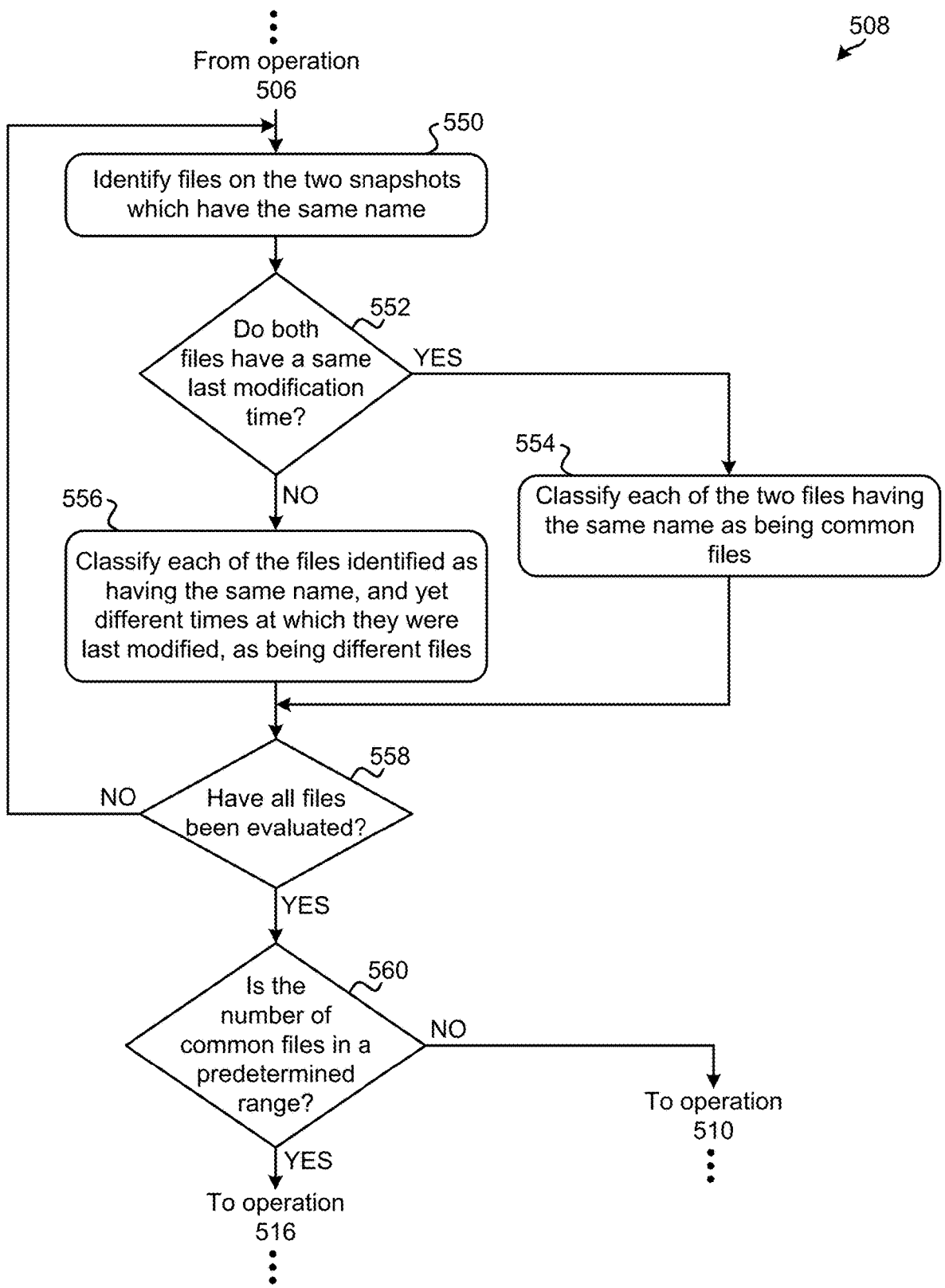
FIG. 5B is a flowchart of sub-processes for one of the operations in the method of FIG. 5A, in accordance with one embodiment.

Referring momentarily to FIG. 5B, exemplary sub-processes of using the checksums to determine whether the two snapshots are sufficiently similar to each other are illustrated in accordance with one embodiment, one or more of which may be used to make the determination in decision 508 of FIG. 5A. However, it should be noted that the sub-processes of FIG. 5B are illustrated in accordance with one embodiment which is in no way intended to limit the invention. For instance, in some approaches, checksums may be calculated and used to determine whether more than two snapshots are sufficiently similar to each other, e.g., as would be appreciated by one skilled in the art after reading the present description.

As shown, sub-operation 550 includes identifying files on the two snapshots which have the same name. The files identified in sub-operation 550 also include a same base (e.g., root) file in some approaches. In other words, sub-operation 550 includes identifying files whose filenames and file paths match, and yet which have different checksums associated therewith, e.g., as would be appreciated by one skilled in the art after reading the present description.

Two files identified in sub-operation 550 are compared and a determination is made as to whether both files have a same last modification time. See decision 552. As mentioned above, some filesystems retain the precise times at which each of the files included therein are modified. These modification times can thereby be used to determine a last time that a given copy of a file was modified.

The flowchart proceeds to sub-operation 554 in response to determining that the last modification time is the same for each of the files identified as having a same name. In other words, the flowchart proceeds to sub-operation 554 in response to determining that the two files identified as having a same name actually include the same data therein. There, sub-operation 554 includes classifying each of these two files having a same name as being common files.

From sub-operation 554, the flowchart jumps to decision 558 which includes determining whether all of the files in the two snapshots have been evaluated. In response to determining that not all of the files in the two snapshots have been evaluated, the flowchart returns to sub-operation 550 such that two or more additional files, each having the same name, may be identified and various ones of the sub-processes in FIG. 5B may be repeated.

However, returning to decision 552, the flowchart proceeds to sub-operation 556 in response to determining that the last modification time is not the same for each of the files identified as having a same name. There, sub-operation 556 includes classifying each of the files identified as having the same name, and yet different times at which they were last modified, as being different files before proceeding to decision 558. It should be noted that in some approaches, three or more files may be identified as having the same name. Moreover, while at least two of the three or more files having the same name may be classified as being common files (e.g., precise copies of each other), at least two of the three or more files having the same name may be classified as being different files. It follows that each unique pair of files having the same name are preferably compared to each other.

Referring still to FIG. 5B, the flowchart proceeds from decision 558 to decision 560 in response to determining that all of the files in the two snapshots have been evaluated. There, decision 560 includes determining whether the number of common files is in a predetermined range. As mentioned above, a range may be represented in terms of percentages of the overall amount of data included in the snapshots, actual amounts of data, an actual number of files, etc. Moreover, "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach.

The flowchart proceeds to operation 510 in response to determining that the number of common files is not in the predetermined range. In other words, a determination is made that the two snapshots are not sufficiently similar to each other in response to determining that the number of common files is not in the predetermined range. Alternatively, the flowchart proceeds to operation 516 in response to determining that the number of common files is in the predetermined range. In other words, a determination is made that the two snapshots are sufficiently similar to each other in response to determining that the number of common files is in the predetermined range.

Returning to FIG. 5A, method 500 proceeds to operation 510 from decision 508 in response to determining that the two snapshots are not sufficiently similar to each other. There, operation 510 includes maintaining each of the two snapshots in their current form. Decision 512 further includes determining whether a global snapshot limit has been reached. As mentioned above, a filesystem has a threshold number of snapshots which can be stored at any given time. Once this threshold has been reached, the filesystem is prevented from creating and/or storing any additional snapshots. Thus, in response to determining that the global snapshot limit for the filesystem has been reached, method 500 proceeds to 514 where a warning is issued to a user. In some approaches, method 500 ends in response to issuing the warning to the user. However, although not shown in FIG. 5A, method 500 returns to operation 502 in other approaches such that two different snapshots may potentially be merged and thereby reduce the number of snapshots stored in the filesystem.

Looking back to decision 512, method 500 is shown as returning to operation 502 in response to determining that the global snapshot limit has not been reached. As mentioned above, returning to operation 502 potentially allows for two different snapshots to be merged and thereby reduce the number of snapshots stored in the filesystem.

Returning now to decision 508, method 500 proceeds to operation 516 in response to determining that the two selected snapshots are sufficiently similar to each other. There, operation 516 includes identifying important ones of the files in each of the two snapshots. As mentioned above, preferred approaches are able to store different versions of the same file, or different files altogether, in appropriate sub-storage tiers. For example, those versions of a given file identified as being "important" are preferably stored in higher performance storage tiers, while versions of that given file identified as not being "important" are preferably stored in lower performance storage tiers. As a result, important files are managed using higher levels of performance (e.g., quicker data access times, fewer read and/or write errors, lower latency, etc.) than files which are not important.

According to some approaches, the importance of a file or a copy of a file is determined based on the rate at which it is used and/or changed (e.g., read from, appended to, truncated, etc.). It follows that in some approaches, "important ones of the files" or "important files" are those files detected in each snapshot which have experienced at least a threshold number of changes to the data included therein. Depending on the approach, the changes to the data included in a given file may be determined based on an amount of new data in the file (e.g., compared to a previous copy of the file in a previous snapshot), a number of changes the file has experienced in a given period of time, a frequency at which the file is changed, etc. In some approaches, these changes are tracked by observing the number of block changes corresponding to the file that have occurred in comparison with a previous version thereof. These files determined as having experienced a threshold number of changes to the data included therein are even stored separately in memory in some approaches. Moreover, those files which are detected are identified as being important files, e.g., using a flag, by amending the metadata thereof, in a lookup table, etc.

According to other approaches, the importance of a file or a copy of a file is determined based on whether the file has been copied to a secondary storage cluster. Again, snapshots are used in some approaches to asynchronously replicate data in a primary storage cluster to a secondary (e.g., backup) storage cluster. It follows that in some approaches, "important ones of the files" or "important files" are those files detected in each snapshot which have not yet been fully replicated to the secondary storage cluster. These files determined as having not yet been fully replicated to the secondary storage cluster are even stored separately in memory in some approaches. Moreover, the detected files are identified as being important files, e.g., using a flag, by amending the metadata thereof, in a lookup table, etc.

Method 500 also includes transitioning important files, determined as being located in a lower performance tier, to a higher performance tier. See operation 518. Similarly, operation 520 includes transitioning the remaining files not identified as being important, determined as being located in the higher performance tier, to the lower performance tier. However, files determined as being located on a performance tier which matches their respective usages are maintained at their current storage locations. For example, referring momentarily back to FIG. 4, any important files determined as being stored in the lower performance storage tier 410 of the multi-tier data storage system at the first storage location 402 are preferably transitioned to the higher performance storage tier 408. Moreover, any of the remaining unimportant files determined as being stored in the higher performance storage tier 408 of the multi-tier data storage system at the first storage location 402 are preferably transitioned to the lower performance storage tier 410. Yet important files determined as being stored in the higher performance storage tier 408 and unimportant determined as being stored in the lower performance storage tier 410 remain in their current storage locations.

Figure 5C:
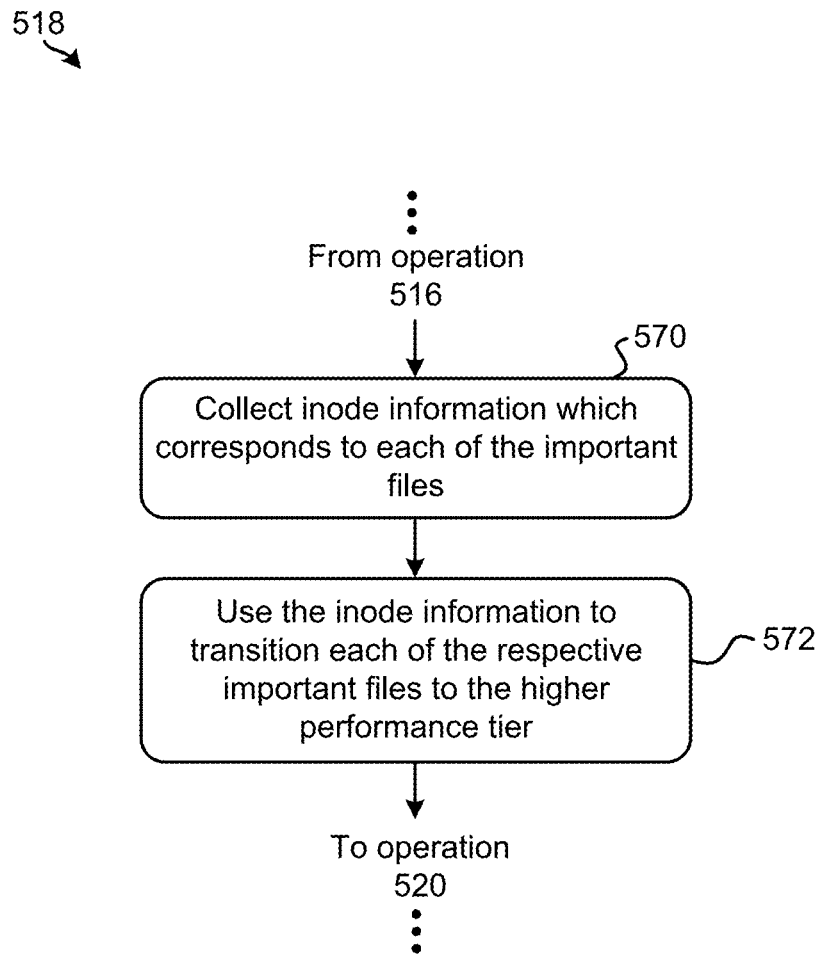
FIG. 5C is a flowchart of sub-processes for one of the operations in the method of FIG. 5A, in accordance with one embodiment.

Referring now momentarily to FIG. 5C, exemplary sub-processes of transitioning important files from a current storage location to a higher performance tier of a multi-tier data storage system are illustrated in accordance with one embodiment, one or more of which may be used to perform operation 518 of FIG. 5A. It should also be noted that the same or similar sub-processes are implemented in some approaches in order to transition the remaining files not identified as being important from a current storage location to a lower performance tier, one or more of which may be used to perform operation 520 of FIG. 5A. However, it should be noted that the sub-processes of FIG. 5C are illustrated in accordance with one embodiment which is in no way intended to limit the invention.

Sub-operation 570 of FIG. 5C includes collecting inode information which corresponds to each of the important files. Inode information is collected from a central inode list in some approaches, but may be collected in any way which would be apparent to one skilled in the art after reading the present description. Moreover, the inode information is used to transition each of the respective important files to the higher performance tier. See sub-operation 572. It follows that some of the approaches included herein provide a provision in the standard filesystem life cycle management framework which is able to accept inode information and use inode placement and/or migration API's to initiate appropriate movement of data, e.g., among the different data storage tiers in a multi-tiered data storage system.

It should be noted that this level of distinction between the levels of importance associated with different versions of a file has previously been unachievable. As a result, some of the embodiments included herein are able to significantly improve data retention, sustained system operation, operating efficiency, etc., particularly for WAN caching DR environments.

Referring again to FIG. 5A, operation 522 further includes creating a single merged snapshot by merging the two snapshots. In some approaches, two snapshots are merged together into a single merged snapshot by comparing each bit of data in each of the snapshots and deduplicating any redundant portions of data. For example, a bit comparison procedure may reveal that "File X" is present in both of the snapshots being merged, and that the data in File X is also the same in both snapshots. As a result, the merged snapshot will only include a single instance of File X.

However, portions of data determined as being different between the two snapshots are preferably preserved such that the merged snapshot is an accurate representation of the data included in both of the snapshots from which it was formed. Each of files identified as having the same name and yet which are different from each other (include at least some different data) are preferably stored under a different directory of the multi-tier data storage system. According to an example, which is in no way intended to limit the invention, two versions (e.g., copies) of "File-1" are merged from two different snapshots into the merged snapshot. As such, each version of "File-1" is stored under the respective "snapshot-<datetime_stamp>/file-1" directory in some approaches (e.g., see FIG. 6 below).

Moving to operation 524, the two snapshots used to create the merged snapshot are deleted, thereby reducing the number of snapshots stored in the corresponding filesystem by one. Moreover, the merged snapshot is preferably provided for additional operations. See operation 526.

Depending on the given approach, the merged snapshot may be used in any number of additional operations. For instance, in some approaches providing the merged snapshot for additional operations includes updating a snapshot marker which corresponds to the merged snapshot, in a caching queue. A caching queue (e.g., WAN caching queue) is used to order snapshots before they are sent to a secondary storage cluster to update a backup of the data stored at a primary storage cluster. Accordingly, the caching queue is accessible by the secondary storage cluster for maintaining an updated copy of the files therein. The merged snapshot may assume the position in the caching queue which the two snapshots used to form the merged snapshot previously had in some approaches, thereby triggering an update to the snapshot markers. In other approaches, the caching queue is simply used to save the merged snapshot in order to conserve storage space. In other words, the merged snapshot is provided for additional operations by being stored in memory and made accessible for future use in the filesystem.

It follows that method 500 is able to accurately identify data duplicity between caching snapshots and use this identified duplicity to merge snapshots. Moreover, important versions of files are identified (e.g., based on replication completion, a number of differences compared with previous versions, etc.) and transitioned to the appropriate performance storage tier while unimportant version of files are also transitioned to an appropriate performance storage tier if not already located therein.

Figure 6:
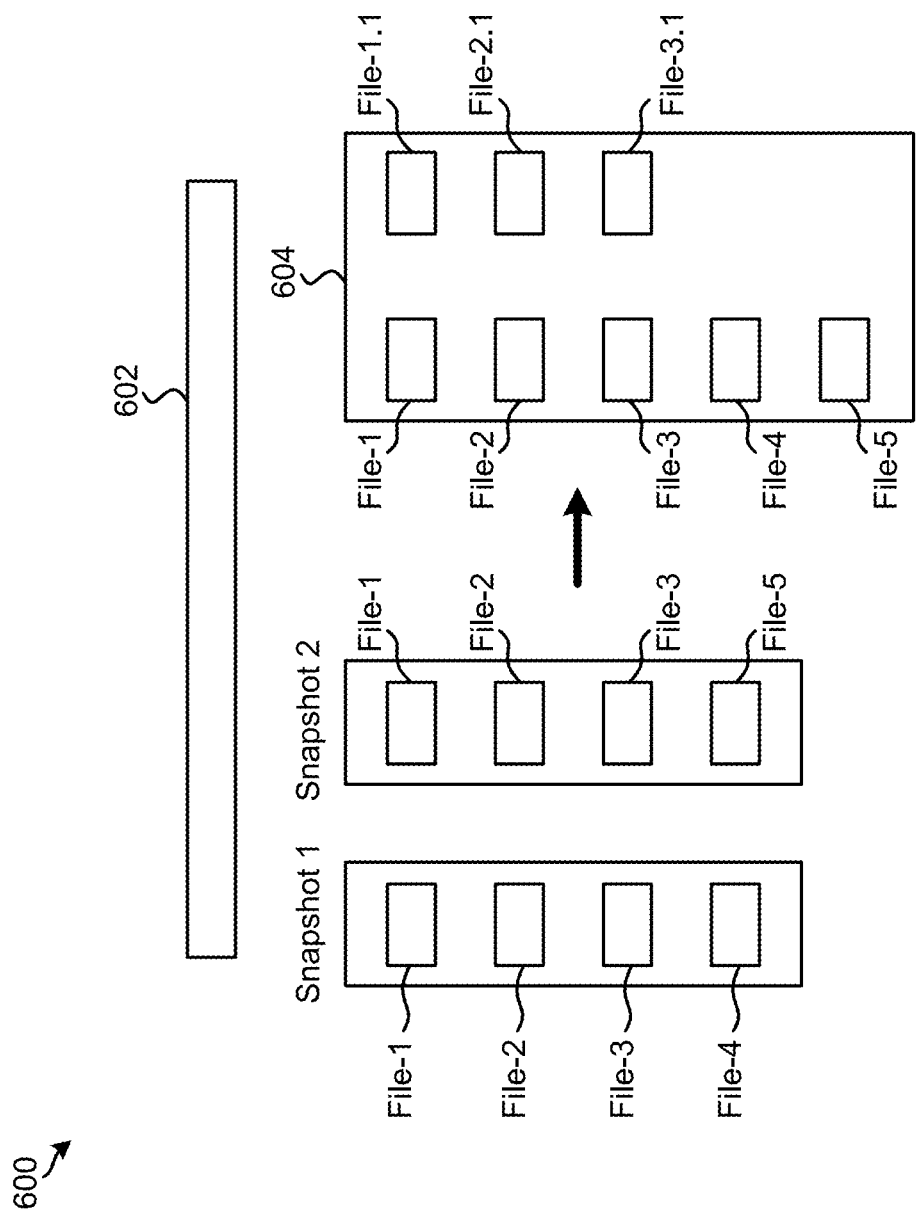
FIG. 6 is a representative view of a primary storage location in accordance with an in-use example.

Looking now to FIG. 6, an in-use example is illustrated in which two WAN caching disaster recovery snapshots are merged at a primary storage location 600. As an option, the present in-use example may be implemented in conjunction with features from any other embodiment listed herein, such as those described with reference to the other FIGS., such as FIGS. 5A-5C. However, this in-use example and others embodiments presented herein may be used in various applications and/or in permutations which may or may not be specifically described in the illustrative embodiments listed herein. Further, the in-use example presented herein may be used in any desired environment.

As shown, the primary storage location 600 includes a clustered filesystem 602 which has captured two different snapshots Snapshot 1 and Snapshot 2. Looking a first of the snapshots Snapshot 1, a number of files File-1, File-2, File-3, File-4, are shown as being represented therein. The second snapshot Snapshot 2 also includes a number of files File-1, File-2, File-3, File-5, some of which overlap with the files included in Snapshot 1.

These two snapshots Snapshot 1 and Snapshot 2 are merged to form a merged snapshot 604, e.g., using any of the approaches described herein. Specifically, files in the two snapshots Snapshot 1 and Snapshot 2 determined as having matching filenames and/or file paths (i.e., File-1, File-2, and File-3) are compared. Comparing these matching files allows for a relative importance of the respective files to be determined, e.g., based on whether each of the files has been replicated at a secondary storage location and/or the amount of data which is different therebetween.

According to the present in-use example, File-1, File-2, and File-3 are each identified as being important. As a result, the merged snapshot 604 includes both versions (e.g., copies) of File-1 from Snapshot 1 and Snapshot 2. As such, one version of the file File-1 has been represented as "File-1" while the other version of the file has been represented as "File-1.1". The same is true for File-2, and File-3 as well. Moreover, each of these versions of the same file are stored under the "snapshot-<datetime_stamp>/<filename>" directory in some approaches.

However, each of File-4 and File-5 are only included in one of the two snapshots used to form the merged snapshot 604. Accordingly, File-4 and File-5 have been identified as being not important files and are reflected as such in the merged snapshot 604.

Although Snapshot 1 and Snapshot 2 are depicted in FIG. 6, they may effectively be deleted in view of the data included in the merged snapshot 604. As a result, the filesystem 602 is able to maintain efficient data disaster recovery while also reducing the amount of storage capacity consumed in order to do so and avoiding the conventional shortcomings.

It follows that various ones of the embodiments included herein are able to provide a framework which improves the process of analyzing data snapshots, and maintaining an accurate backup of a primary storage location. According to some approaches, these improvements are achieved by accurately identifying data duplicity between caching snapshots and using this identified duplicity to merge snapshots. Moreover, important versions of files are identified (e.g., based on replication completion, a number of differences compared with previous versions, etc.) and transitioned to the appropriate performance storage tier while unimportant version of files are also transitioned to an appropriate performance storage tier if not already located therein. Some of the embodiments included herein are thereby able to desirably achieve increased reliability and consistency across storage locations of a distributed storage system which are connected by a network, e.g., such as a WAN. As a result, the system (e.g., filesystem) is able to improve data retention by managing snapshot consolidation and appropriate usage of the different performance tiers, thereby also significantly reducing system downtime, network usage, memory consumption, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    selecting two previously captured snapshots;
    calculating a checksum for each file in each of the two snapshots;
    using the checksums to determine whether the two snapshots are sufficiently similar to each other;
    in response to determining that the two snapshots are sufficiently similar to each other, identifying important ones of the files in each of the two snapshots;
    transitioning the identified important files that are located in a lower performance tier of a multi-tier data storage system to a higher performance tier of the multi-tier data storage system;
    creating a merged snapshot by merging the two snapshots; and
    providing the merged snapshot for additional operations, wherein using the checksums to determine whether the two snapshots are sufficiently similar to each other includes:
        in response to determining that the last modification time is the same for each of the files identified as having a same name, classifying each of the files identified as having a same name as being common files,
        determining whether the number of common files is in a predetermined range, and
        determining that the two snapshots are sufficiently similar to each other in response to determining that the number of common files is in the predetermined range.

2. The computer-implemented method of claim 1, wherein using the checksums to determine whether the two snapshots are sufficiently similar to each other includes:
    identifying files on the two snapshots which have the same name;
    for each of the files identified as having a same name, determining whether a last modification time is the same; and
    in response to determining that the last modification time is not the same for each of the files identified as having a same name, classifying each of the files identified as having a same name as being different files.

3. The computer-implemented method of claim 2, wherein creating a merged snapshot by merging the two snapshots includes:
    storing each of the different files having the same name under a different directory.

4. The computer-implemented method of claim 1, wherein transitioning the identified important files to a higher performance tier of a multi-tier data storage system includes:
    collecting inode information which corresponds to each of the important files; and
    using the inode information to transition each of the respective important files to the higher performance tier.

5. The computer-implemented method of claim 4, comprising:
    transitioning the remaining files not identified as being important and that are located in the higher performance tier to the lower performance tier.

6. The computer-implemented method of claim 1, wherein the operations are performed by a controller coupled to a primary storage cluster, wherein the primary storage cluster includes the multi-tier data storage system, wherein the controller is configured to communicate with a secondary storage cluster, wherein the primary and secondary storage clusters are geographically separated from each other.

7. The computer-implemented method of claim 6, wherein the controller is configured to communicate with the secondary storage cluster using a wide area network.

8. The computer-implemented method of claim 6, wherein identifying important ones of the files in each of the two snapshots includes:
    detecting files in each of the two snapshots which have not yet been copied to the secondary storage cluster; and
    identifying the detected files as the important files.

9. The computer-implemented method of claim 1, wherein identifying important ones of the files in each of the two snapshots includes:
    detecting files in each of the two snapshots which have experienced at least a threshold number of changes to the data included therein; and
    identifying the detected files as the important files.

10. The computer-implemented method of claim 1, wherein providing the merged snapshot for additional operations includes:
    updating a snapshot marker, which corresponds to the merged snapshot, in a caching queue,
    wherein the caching queue is accessible by a secondary storage cluster for maintaining a copy of the files in the multi-tier data storage system.

11. A computer program product comprising a computer readable storage medium having program instructions embodied therewith, the program instructions readable and/or executable by a processor to cause the processor to:
    select, by the processor, two previously captured snapshots;
    calculate, by the processor, a checksum for each file in each of the two snapshots;
    use, by the processor, the checksums to determine whether the two snapshots are sufficiently similar to each other;
    in response to determining that the two snapshots are not sufficiently similar to each other, maintain, by the processor, the two snapshots in their current form;
    in response to determining that the two snapshots are sufficiently similar to each other, identify, by the processor, important ones of the files in each of the two snapshots;

transition, by the processor, the identified important files that are located in a lower performance tier of a multi-tier data storage system to a higher performance tier of the multi-tier data storage system;

create, by the processor, a merged snapshot by merging the two snapshots; and provide, by the processor, the merged snapshot for additional operations, wherein using the checksums to determine whether the two snapshots are sufficiently similar to each other includes:

in response to determining that the last modification time is the same for each of the files identified as having a same name, classifying each of the files identified as having a same name as being common files, determining whether the number of common files is in a predetermined range, and determining that the two snapshots are sufficiently similar to each other in response to determining that the number of common files is in the predetermined range.

12. The computer program product of claim 11, wherein using the checksums to determine whether the two snapshots are sufficiently similar to each other includes:

identifying files on the two snapshots which have the same name;

for each of the files identified as having a same name, determining whether a last modification time is the same; and in response to determining that the last modification time is not the same for each of the files identified as having a same name, classifying each of the files identified as having a same name as being different files.

13. The computer program product of claim 12, wherein creating a merged snapshot by merging the two snapshots includes:

storing each of the different files having the same name under a different directory.

14. The computer program product of claim 11, wherein transitioning the identified important files to a higher performance tier of a multi-tier data storage system includes:

collecting inode information which corresponds to each of the important files; and using the inode information to transition each of the respective important files to the higher performance tier.

15. The computer program product of claim 11, wherein the processor is coupled to a primary storage cluster, wherein the primary storage cluster includes the multi-tier data storage system, wherein the processor is configured to communicate with a secondary storage cluster, wherein the primary and secondary storage clusters are geographically separated from each other.

16. The computer program product of claim 15, wherein the processor is configured to communicate with the secondary storage cluster using a wide area network.

17. The computer program product of claim 15, wherein identifying important ones of the files in each of the two snapshots includes:

detecting files in each of the two snapshots which have not yet been copied to the secondary storage cluster; and identifying the detected files as the important files.

18. The computer program product of claim 11, wherein identifying important ones of the files in each of the two snapshots includes:

detecting files in each of the two snapshots which have experienced at least a threshold number of changes to the data included therein; and identifying the detected files as the important files.

19. The computer program product of claim 11, wherein providing the merged snapshot for additional operations includes:

updating a snapshot marker, which corresponds to the merged snapshot, in a caching queue, wherein the caching queue is accessible by a secondary storage cluster for maintaining a copy of the files in the multi-tier data storage system.

20. A system, comprising:

a processor; and logic integrated with the processor, executable by the processor, or integrated with and executable by the processor, the logic being configured to:

select, by the processor, two previously captured snapshots;

calculate, by the processor, a checksum for each file in each of the two snapshots;

use, by the processor, the checksums to determine whether the two snapshots are sufficiently similar to each other;

in response to determining that the two snapshots are sufficiently similar to each other, identify, by the processor, important ones of the files in each of the two snapshots;

transition, by the processor, the identified important files that are located in a lower performance tier of a multi-tier data storage system to a higher performance tier of the multi-tier data storage system;

create, by the processor, a merged snapshot by merging the two snapshots; and provide, by the processor, the merged snapshot for additional operations, wherein using the checksums to determine whether the two snapshots are sufficiently similar to each other includes:

in response to determining that a last modification time is the same for each file identified as having a same name, classifying each of the files identified as having a same name as being common files, determining whether the number of common files is in a predetermined range, and determining that the two snapshots are sufficiently similar to each other in response to determining that the number of common files is in the predetermined range.

* * * * *